(12) United States Patent
Liu et al.

(10) Patent No.: US 10,970,148 B2
(45) Date of Patent: Apr. 6, 2021

(54) METHOD, DEVICE AND COMPUTER PROGRAM PRODUCT FOR MANAGING INPUT/OUTPUT STACK

(71) Applicant: EMC IP Holding Company LLC, Hopkinton, MA (US)

(72) Inventors: Bing Liu, Tianjin (CN); Man Lv, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 31 days.

(21) Appl. No.: 16/166,491

(22) Filed: Oct. 22, 2018

(65) Prior Publication Data
US 2019/0129787 A1  May 2, 2019

(51) Int. Cl.
*G06F 11/00* (2006.01)
*G06F 11/07* (2006.01)
*G06F 11/20* (2006.01)
*G06F 3/06* (2006.01)

(52) U.S. Cl.
CPC .......... *G06F 11/0757* (2013.01); *G06F 3/061* (2013.01); *G06F 3/0659* (2013.01); *G06F 11/079* (2013.01); *G06F 11/0793* (2013.01); *G06F 11/201* (2013.01); *G06F 3/067* (2013.01); *G06F 3/0617* (2013.01); *G06F 3/0656* (2013.01); *G06F 2201/81* (2013.01); *G06F 2201/835* (2013.01)

(58) Field of Classification Search
CPC .... G06F 3/061; G06F 3/0659; G06F 11/0727; G06F 11/0745; G06F 11/0757; G06F 11/0793; G06F 11/1616
See application file for complete search history.

(56) References Cited

U.S. PATENT DOCUMENTS

| | | | |
|---|---|---|---|
| 10,185,639 B1 * | 1/2019 | Chatterjee | G06F 11/2092 |
| 10,282,245 B1 * | 5/2019 | Viswanathan | G06F 11/079 |
| 2003/0101371 A1 * | 5/2003 | Fairhurst | G06F 11/0727 714/5.11 |
| 2020/0026596 A1 * | 1/2020 | Reed | G06F 11/0757 |

* cited by examiner

*Primary Examiner* — Michael Maskulinski
(74) *Attorney, Agent, or Firm* — Krishnendu Gupta; Peter Jovanovic (57) ABSTRACT

Embodiments of the present disclosure provide a method, device and computer program product for managing an input/output (I/O) stack. The method comprises obtaining metadata related to an I/O request stored in the I/O stack, the metadata at least comprising a timestamp when the I/O request is placed in the I/O stack; determining, based on the timestamp, a length of time during which the I/O request waits for processing; and in response to the length of time exceeding a threshold time length, performing a predetermined operation on the I/O request to prevent the I/O stack from being congested.

15 Claims, 8 Drawing Sheets

METHOD, DEVICE AND COMPUTER PROGRAM PRODUCT FOR MANAGING INPUT/OUTPUT STACK

RELATED APPLICATIONS

This application claim priority from Chinese Patent Application Number CN 201711027429.X, filed on Oct. 27, 2017 at the State Intellectual Property Office, China, titled "METHOD, DEVICE AND COMPUTER PROGRAM PRODUCT FOR MANAGING INPUT/OUTPUT STACK" the contents of which is herein incorporated by reference in its entirety.

FIELD

Embodiments of the present disclosure generally relate to the field of input/output device, and more specifically, to a method, device and computer program product for managing input/output stack.

BACKGROUND

With the development of computing device, fast processing for data is becoming more and more important. With the development of storage devices, the external storage devices connected to the computing device are getting more and more, such as solid state disk (SSD), hard disk drive (HDD), storage area network (SAN) and so on. They require the use of different host bus adapters to be connected to the computing device, thus causing the drive of the computing device to increase considerably. This makes the process of managing the input/output I/O operation of the storage devices by the operating system more and more complex. Besides, the amount of data to be processed also increases quickly, so that the I/O operations to the storage devices are increasingly more frequent.

Generally, during the process of processing I/O operations by an operating system, the operating system will generate an I/O stack for processing the I/O operations. The operating system configures the I/O stack into multiple layers and transmits the I/O operation through the collaboration of multiple layers. The multiple layers of the I/O stack generally includes an I/O scheduling layer, a block layer and an SCSI layer, or sometimes a virtual memory layer. Each layer in the I/O stack is generally used for different purposes, for instance, I/O scheduling layer is used to schedule the received I/O requests and then configure more important I/O requests to be processed with priority through a scheduling algorithm; and the block layer is used to queue and merge different I/O requests and send them down to the lower layer. Through a multi-layered I/O stack, the I/O requests are processed reasonably, thereby achieving quick input or output of data.

SUMMARY

Embodiments of the present disclosure provide a method, device and computer program product for managing input/output stacks.

In accordance with a first aspect of the present disclosure, there is provided a method for managing input/output (I/O) stacks, comprising: obtaining metadata related to an I/O request stored in the I/O stack, the metadata at least comprising a timestamp when the I/O request is placed in the I/O stack. The method further comprises determining, based on the timestamp, a length of time during which the I/O request waits for processing. The method further comprises: in response to the length of time exceeding a threshold time length, performing a predetermined operation on the I/O request to prevent the I/O stack from being congested.

In some embodiments, performing a predetermined operation on the I/O request comprises: ceasing all I/O requests in the I/O stack; and storing all data in the I/O stack into an external storage device.

In some embodiments, performing a predetermined operation on the I/O request comprises: obtaining, from the I/O stack, information on at least one operation for processing the I/O request; and determining, based on the information, an operation from the at least one operation that causes the I/O request to wait for processing.

In some embodiments, performing a predetermined operation on the I/O request comprises: determining whether a fault is present in one or more devices involved in the I/O request; in response to determining that a fault is present in at least one of the one or more devices, determining whether there is an alternative device that can replace the at least one device to enable the I/O request to be performed; and in response to finding the alternative device, performing the I/O request at least in part based on the alternative device.

In some embodiments, performing a predetermined operation on the I/O request comprises: in response to the I/O request involving a discovery process for an external device, terminating the discovery process.

In some embodiments, the method further comprises: determining the number of I/O requests currently queuing at a layer where the I/O request in the I/O queue is located; and adjusting the threshold time length based on the number.

In a second aspect of the present disclosure, there is provided a manager for an input/output (I/O) stack, comprising: a processor; and a memory having computer program instructions stored thereon, the processor executing the computer program instructions in the memory to control the manager to perform acts comprising: obtaining metadata related to an I/O request stored in the I/O stack, the metadata at least comprising a timestamp when the I/O request is placed in the I/O stack; determining, based on the timestamp, a length of time during which the I/O request waits for processing; and in response to the length of time exceeding a threshold time length, performing a predetermined operation on the I/O request to prevent the I/O stack from being congested.

In some embodiments, performing a predetermined operation on the I/O request comprises: ceasing all I/O requests in the I/O stack; and storing all data in the I/O stack into an external storage device.

In some embodiments, performing a predetermined operation on the I/O request comprises: obtaining, from the I/O stack, information on at least one operation for processing the I/O request; and determining, based on the information, an operation from the at least one operation that causes the I/O request to wait for processing.

In some embodiments, performing a predetermined operation on the I/O request comprises: determining whether a fault is present in one or more devices involved in the I/O request; in response to determining that a fault is present in at least one of the one or more devices, determining whether there is an alternative device that can replace the at least one device to enable the I/O request to be performed; and in response to finding the alternative device, performing the I/O request at least in part based on the alternative device.

In some embodiments, performing an act for processing the request comprises: in response to the I/O request involving a discovery process for an external device, terminating the discovery process.

In some embodiments, the acts further comprising: determining the number of I/O requests currently queuing at a layer where the I/O request in the I/O queue is located; and adjusting the threshold time length based on the number.

In accordance with a third aspect of the present disclosure, there is provided a computer program product being tangibly stored on a non-volatile computer readable medium and comprising computer executable instructions which, when executed, cause a machine to perform acts comprising: obtaining metadata related to an I/O request stored in the I/O stack, the metadata at least comprising a timestamp when the I/O request is placed in the I/O stack; determining, based on the timestamp, a length of time during which the I/O request waits for processing; and in response to the length of time exceeding a threshold time length, performing a predetermined operation on the I/O request to prevent the I/O stack from being congested.

In some embodiments, performing a predetermined operation on the I/O request comprises: ceasing all I/O requests in the I/O stack; and storing all data in the I/O stack into an external storage device.

In some embodiments, performing a predetermined operation on the I/O request comprises: obtaining, from the I/O stack, information on at least one operation for processing the I/O request; and determining, based on the information, an operation from the at least one operation that causes the I/O request to wait for processing in order to process.

In some embodiments, performing a predetermined operation on the I/O request comprises: determining whether a fault is present in one or more devices involved in the I/O request; in response to determining that a fault is present in at least one of the one or more devices, determining whether there is an alternative device that can replace the at least one device to enable the I/O request to be performed; and in response to finding the alternative device, performing the I/O request at least in part based on the alternative device.

In some embodiments, performing a predetermined operation on the I/O request comprises: in response to the I/O request involving a discovery process for an external device, terminating the discovery process.

In some embodiments, the acts further include determining the number of I/O requests currently queuing at a layer where the I/O request in the I/O queue is located; and adjusting the threshold time length based on the number.

BRIEF DESCRIPTION OF THE DRAWINGS

Through more detailed description of example embodiments of the present disclosure with reference to the accompanying drawings, the above and other objectives, features, and advantages of example embodiments of the present disclosure will become more apparent. In example embodiments of the present disclosure, the same reference signs usually refer to the same components.

In each drawing, the same or corresponding signs refer to the same or corresponding elements.

DETAILED DESCRIPTION OF EMBODIMENTS

Principles of the present disclosure will now be described with reference to some example embodiments. It should be appreciated that description of those embodiments is merely to enable those skilled in the art to better understand and further implement example embodiments disclosed herein and does not suggest any limit to the scope of the present disclosure. The content of the present disclosure described herein may be implemented in various manners besides those described in the following.

As used herein, the term "includes" and its variants are to be considered as open-ended terms that mean "includes, but is not limited to." The term "based on" is to be understood as "based at least in part on." The term "one example embodiment" is to be read as "at least one embodiment." The term "another embodiment" is to be read as "at least one another embodiment."

As stated above, an I/O stack contains multiple layers, including an I/O scheduling layer, a block layer and an SCSI layer, each layer having its respective queue for storing requests, commands or event information. For example, a request queue is stored in the I/O scheduling layer, a request queue is also stored in the block layer, and there are a command queue and an event queue in the SCSI layer.

However, although the multilayer structure of the I/O stack can process various requests well, during the process of processing requests or commands, the requests, commands or events can not be responded due to different reasons. As a result, these requests, commands or events stored in the sequential queue are kept in the head of the queue and consequently, therefore the following requests or commands cannot be performed. Even if the computing device has sufficient resources, as the requests or commands before are congested, the operations thereafter cannot be implemented. Since in the prior art, the I/O stack is not managed, when the requests are congested, it is impossible to determine the reason or resolve the problem, causing the device to halt and incurring resource waste.

To this end, embodiments of the present disclosure provide a solution for managing the I/O stack. In this solution, the operation of the I/O stack is improved by monitoring the queue.

Figure 1:
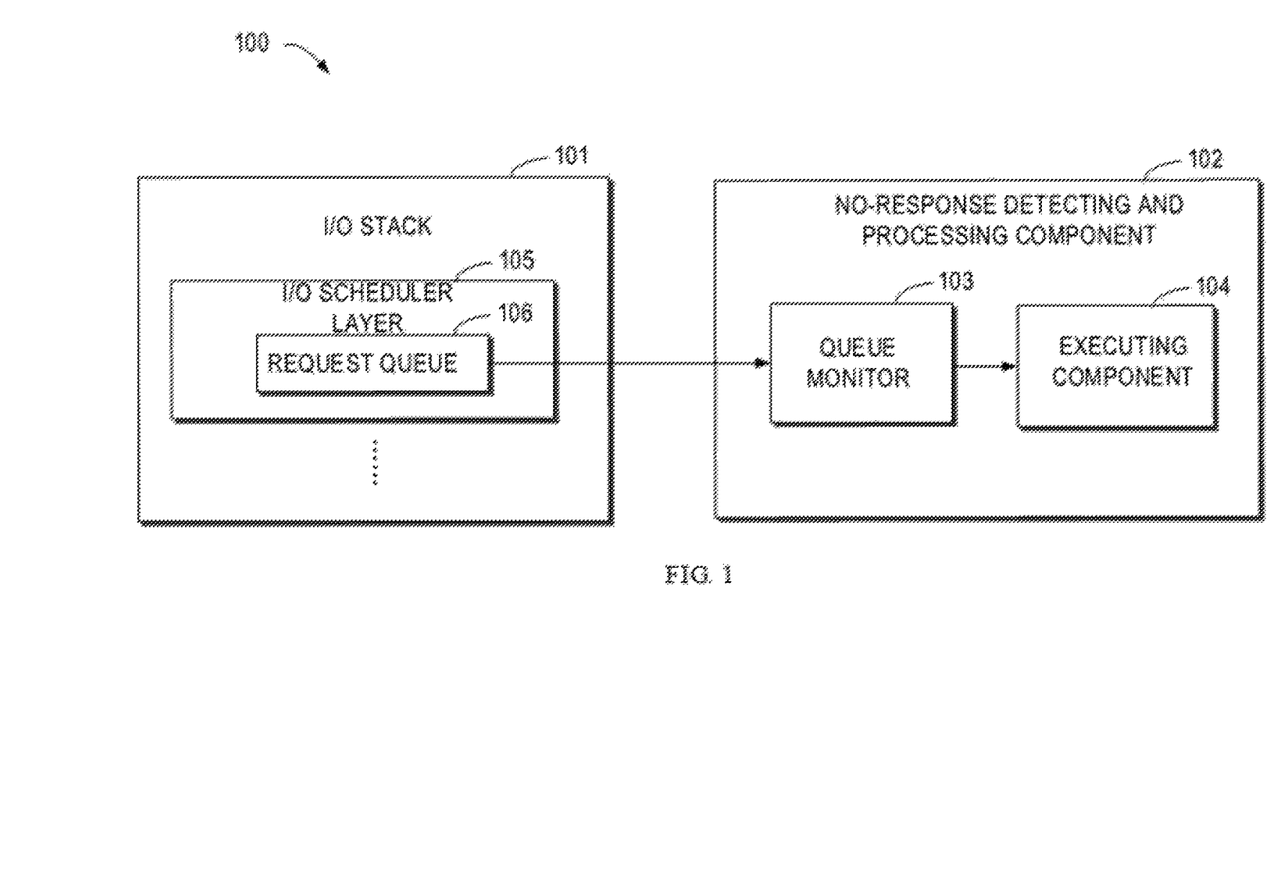
FIG. 1 is an architecture diagram illustrating a system 100 for managing an I/O stack in accordance with embodiments of the present disclosure.

FIG. 1 is a schematic diagram illustrating an example management system 100 of I/O stack that may be implemented in embodiments of the present disclosure. The management system 100 includes an I/O stack 101 and a no-response detecting and processing component 102.

The I/O stack 101 is used to transmit input/output requests between the processor and the external storage device. The I/O stack 101 may have one or more layers. As shown in FIG. 1, the I/O stack 101 at least includes an I/O scheduler layer 105.

The I/O scheduler layer 105 receives an I/O request from the processor and places the I/O request in a request queue 106 through a scheduling algorithm operating therein. For example, important requests may be placed in the head of the queue based on quality of service (QOS) during scheduling so that the I/O request can be processed in advance, thereby improving the efficiency of I/O processing.

Requests are stored sequentially in the request queue 106 of the scheduler layer 105. If the first request in the queue is not responded to, the whole system would be unable to operate normally.

To resolve this problem existing in the queue of the I/O stack 101, a component for managing the stack is configured in the technical solution of the present disclosure. This component can determine the problem quickly, provide accurate information for the user, and process the occurring problem in a reasonable handling manner based on user's choice. Therefore, the operation efficiency of the I/O stack 101 is improved.

In some embodiments of the present disclosure, a no-response detecting and processing component 102 is provided which includes a queue monitor 103 and an executing component 104.

The queue monitor 103 is used to monitor the queues inside the I/O stack. When the queues are monitored, the queue monitor may obtain information about the queues from a queue, such as the request queue 106. In an example, information of the queue may include an identifier of the queue, length of the queue and timestamp information. In another embodiment, information of the queue may include any information about the queue required by the user. Each request in the queue is provided with a timestamp when it is placed in the queue. The queue monitoring component 103 may, based on timestamp information obtained from the queue, determine the length of time that the first request in the queue waits for processing.

The queue monitor 103 may also be used to compare the determined waited length of time for the request and a threshold time length, and send information associated with the comparison result to the executing component 104. In an embodiment, the threshold length of time is stored in a component inside the queue monitor 103. Alternatively, the threshold time length may also be obtained by the queue monitor 103 from other components. In an embodiment, the threshold time length may be adjusted by the user.

The executing component 104 processes the congested queues based on various pre-configured policies. The policies for processing the queues are predetermined based on user's demands and queue characteristics.

The composition structure of the management system 100 for managing the I/O stack is described above. To depict the process of managing the I/O stack by the managing system 100 more clearly, the management method of the management system 100 will be described below in detail with reference to the components in FIG. 1 and the method in FIGS. 2-6.

Figure 2:
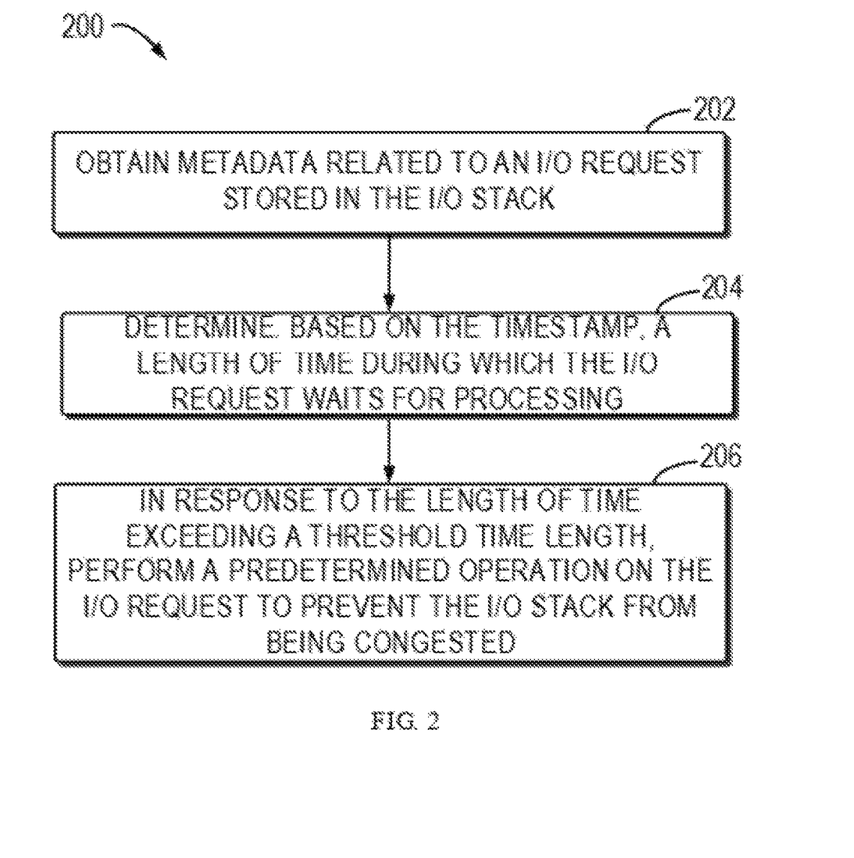
FIG. 2 is a schematic diagram illustrating a method 200 for managing an I/O stack in accordance with embodiments of the present disclosure.

FIG. 2 is a schematic diagram illustrating a method 200 for managing the I/O stack in accordance with embodiments of the present disclosure.

When queues in the I/O stack are managed, the queue monitor 103 monitors the queues in the layers of the I/O stack. In an embodiment, when the requests are placed in the queues in the layers inside the I/O stack, each request is provided with a timestamp. As the queues are sequential queues, the request of the queue with the longest waiting time can be determined by the timestamp of a first element in the queue. In an embodiment, the queue monitor 103 sends a query request to queues inside the stack to obtain information about the queues. Alternatively, it is also possible to send information associated with the queues to the queue monitor in other manners.

At block 202, the queue monitor 103 may obtain metadata related to I/O request in the queue from the queues of I/O stack 101. For example, data information associated with the queues and the I/O requests may be obtained from the request queue 106, namely, data information associated with queues and elements in the queues is obtained from the queues. In an embodiment, the metadata include an identifier of the queue, length of the queue and timestamp information of a first element in the queue. Alternatively, the request in the present disclosure may also be used to refer to commands and events associated with the executing for I/O requests in the I/O stack.

At block 204, the queue monitor 103 may obtain timestamp information from the above metadata. Based on the obtained timestamp, the length of time during which the I/O request waits for processing is determined. In an embodiment, the waiting time length for the request in the queue is determined by the difference between the time for obtaining the timestamp and the timestamp.

After the length of time for the request in the queue to wait to be processed is obtained, the queue monitor 103 further obtains a threshold time length. As stated above, the threshold time length may be obtained from inside the monitor or from other components, and the threshold time length may be configured and adjusted by the user.

Additionally or alternatively, the information obtained from the queue or metadata may further include the length of the queue (namely, the number of requests in the queue). The queue monitor 103 may further adjust the threshold time length based on the length of the queue. When the length of a queue in a layer is too long, it indicates that the queue stores many elements and thus, should be processed more quickly. Under this condition, the threshold time length may be reduced accordingly. In an embodiment, all the queues in different layers may use one threshold time length. In another alternative embodiment, different queues in different layers have different threshold time lengths.

At block 206, when the length of time exceeds the threshold time length, it shows that queues inside the I/O stack are congested. The queue monitor 103 will generate a message indicating that the queues of the I/O stack are congested, which is transmitted to the executing component 104 to perform predetermined operations so as to prevent I/O queues from being congested.

Figure 3:
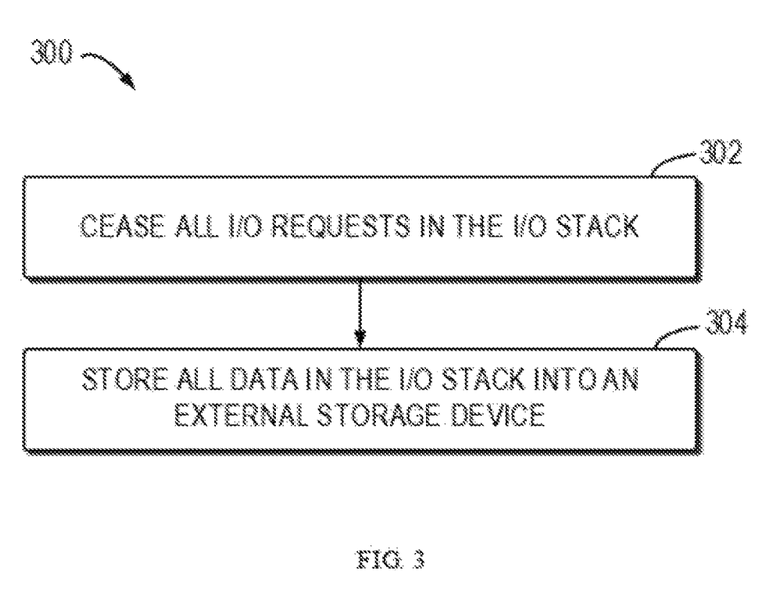
FIG. 3 is a flowchart illustrating a method 300 for preventing I/O stack congestion in accordance with embodiments of the present disclosure.

FIG. 2 is a specific method of obtaining queue congestion and transmitting a message. After the message is received, the user may use various processing patterns based on the preconfigured option. FIG. 3 shows a processing method of kernel error. To further depict the processing method of kernel error in detail, reference will be made to various steps in FIG. 3 for detailed depiction.

When receiving a message indicating the queues are congested, the executing component 104 implements kernel error processing operation. In an example, for instance, at block 302, the operations of all the I/O requests inside the I/O stack are ceased when the kernel error processing operation is performed. Then at block 304, all the data inside the I/O stack are stored in an external device. In another example, when the kernel error processing operation is performed, all the operations inside the computing device may be halted and all the data inside the computing device are stored in an external device.

With this processing mode of the kernel error, the demand of user who does not allow any congesting problem can be satisfied and system kernel error information can be collected timely and kernel documents may be duplicated so that the user makes a quick response to queue congestion, thereby improving the efficiency of solving the problem.

Figure 4:
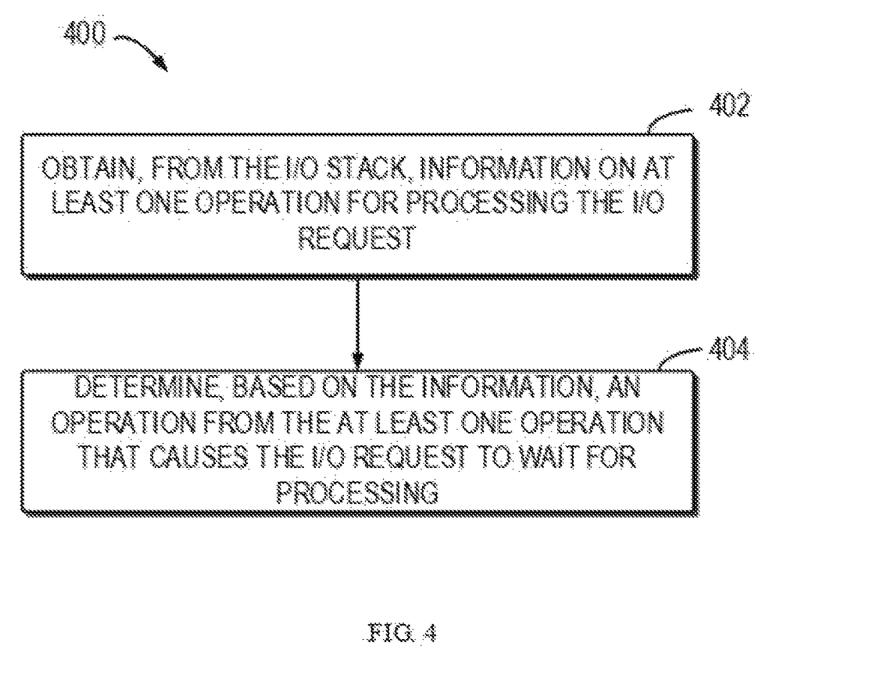
FIG. 4 is a flowchart illustrating a method 400 for preventing I/O stack congestion in accordance with embodiments of the present disclosure.

As stated above, FIG. 3 shows a relatively direct solution for processing congestion of queues. However, sometimes the user hopes that the management device can provide reasons why the queues are congested automatically. Reference will be made to FIG. 4 to depict a processing mode in which reasons why the queues are congested can be provided.

At block 402, information on at least one operation for processing I/O request is obtained from the I/O stack. The executing component 104 collects all the information from the I/O stack 101 and filters information irrelevant to requests in the congested I/O queues through a filtering component inside the analyzer module and retains information associated with the congested requests. In an example, the information includes information associated with operation (function name), timestamp and so on. Alternatively or additionally, the information may also include any information that the user hopes to obtain.

After obtaining the information, at block 404, the executing component 104 determines an operation from at least one operation that causes the I/O request to wait for processing. The selected operation is then returned to the user for use by the user. In an example, the executing component 104 may analyze information associated with the congested requests and select information of multiple most likely operations. As an example, five most likely operations are selected from a plurality of operations and the information of the five operations is transmitted to the user. As another example, it is possible to select any number of operations from a plurality of operations to transmit to the user.

Through this processing strategy, reasons why the queues are congested may be returned to the user timely and accurately to enable the user to resolve problems in the queues quickly and accurately, thereby improving efficiency of processing queue clogging in the I/O stack.

Figure 5:
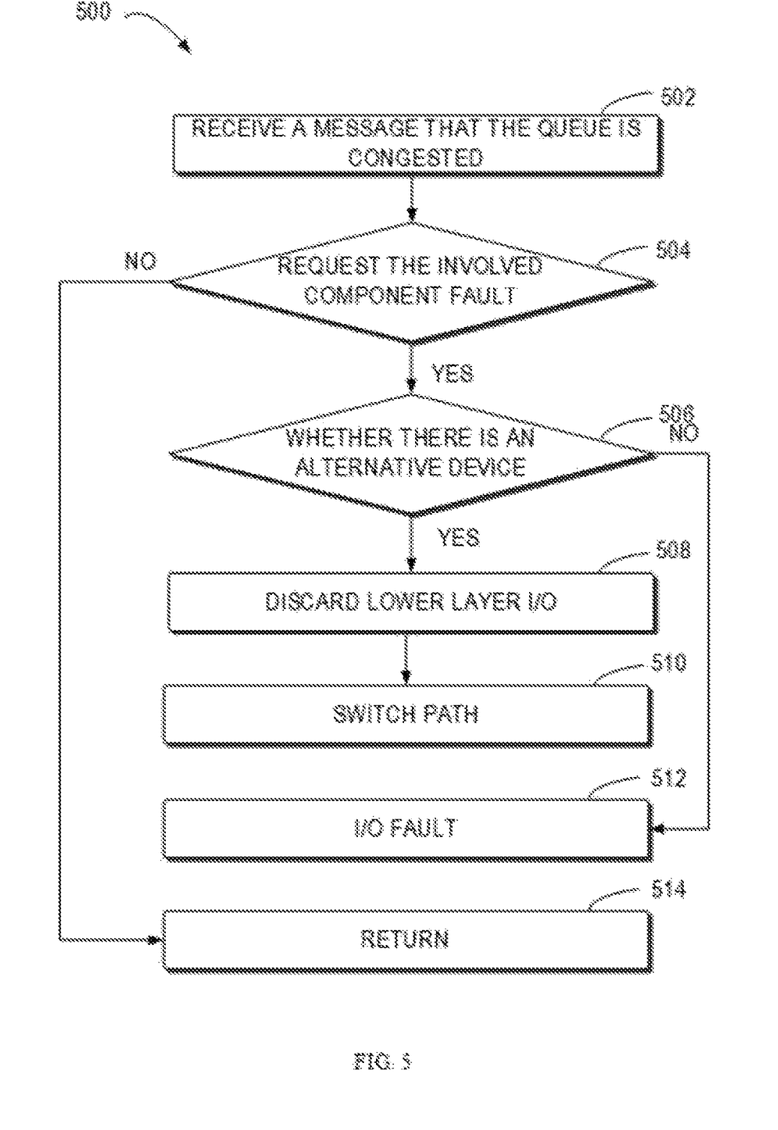
FIG. 5 is a block diagram illustrating a method 500 for preventing I/O stack congestion in accordance with embodiments of the present disclosure.

FIG. 4 shows that a method for processing congested requests is recommend to the user. The method for processing congestion of different queues will be depicted below with reference to FIGS. 5 and 6. FIG. 5 shows a method for processing the request queue.

At block 502, the executing component 104 receives a message about a queue being congested. After receiving this message, it is determined at block 504 whether there is a fault in the one or more devices involved in the I/O request. For example, it is determined whether there is a problem in the I/O path during the transmission process of the I/O request, that is, whether the components that the I/O request passes through have failure. If no, then the returning process is performed.

If there is a fault in at least one device among the one or more devices involved in the I/O request, then it is determined at block 506 whether there is an alternative device capable of replacing the at least one device to cause the I/O request to be performed, that is, for determining if there is a spare I/O path. For example, if a connection line for connecting the disk to the host bus adapter has a fault, it will look for other connection lines. During the lookup process, the external storage device may be found by determining an identifier of the external storage device in the congested requests, and then it is determined from the external storage device if there are other spare I/O paths. If there are no alternative devices at 506, the I/O fault is returned.

At 508, in response to finding an alternative device, the I/O request is executed at least partly based on the alternative device. When an available alternative device is found, the underlying I/O operation of congested I/O requests that were not completed previously is discarded first, and then the I/O request operation is performed with a new I/O path in which the alternative device is used.

Figure 6:
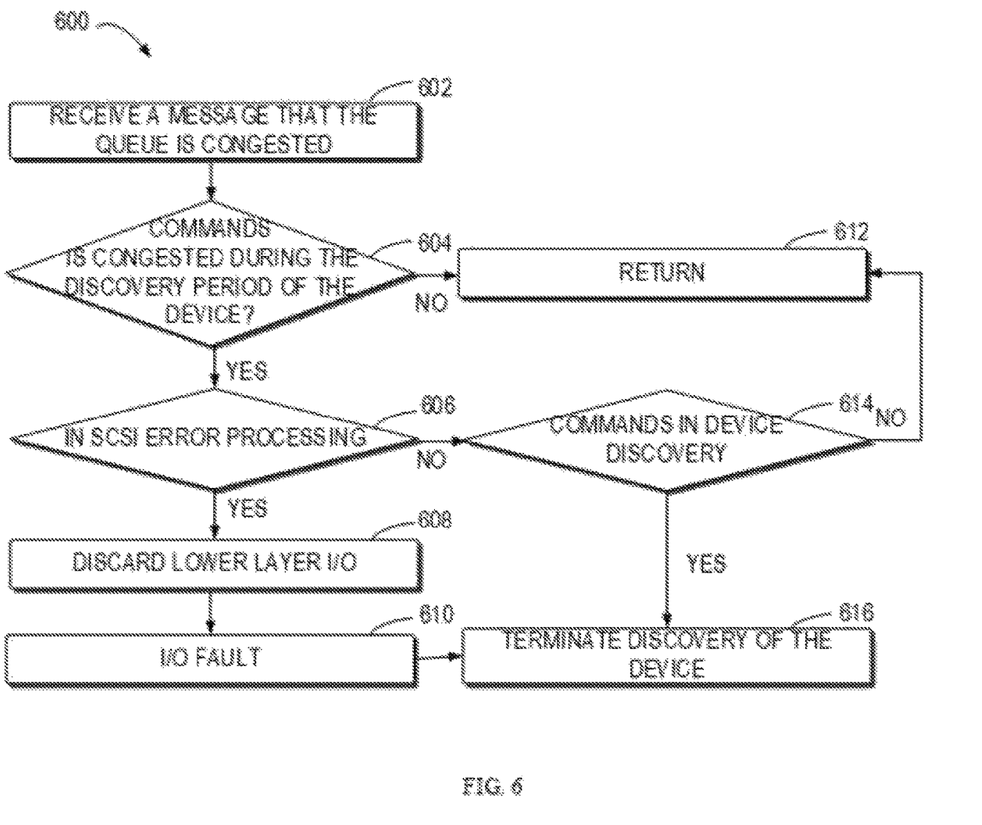
FIG. 6 is a block diagram illustrating a method 600 for preventing I/O stack congestion in accordance with embodiments of the present disclosure.

FIG. 5 illustrates a method of processing congested requests from a request queue and FIG. 6 is a block diagram illustrating a method 600 for processing congested command queues during the discovery process of an external device. During this process, the discovery process is terminated mainly by responding to the I/O request involving the discovery process of the external device. The implementation process will be described below in detail.

At 602, the message that the queues are congested is received. After the message is received, it is determined at block 604 whether there are commands congested during the discovery process of the device in the congested queues. If no, then return.

If yes, proceed to block 606 at which it is determined whether they are commands during the SCSI error processing process. If yes, then operation of the underlying I/O is discarded at block 608, and it is determined at block 610 that there is a fault 610, then discovery of the device is terminated at block 616.

If the command is not a command during the SCSI error processing process, at block 614, it is determined whether it is a command during the discovery of the device. If yes, at block 616, the discovery of the device is terminated. If no, the returning process is performed.

By processing queues inside the I/O stack based on which queue the request comes from, as shown in FIGS. 5 and 6, problems occurring in the queues are processed in different ways so that the problems are processed more accurately, thereby providing a more reasonable solution to the problem that has occurred.

Figure 7:
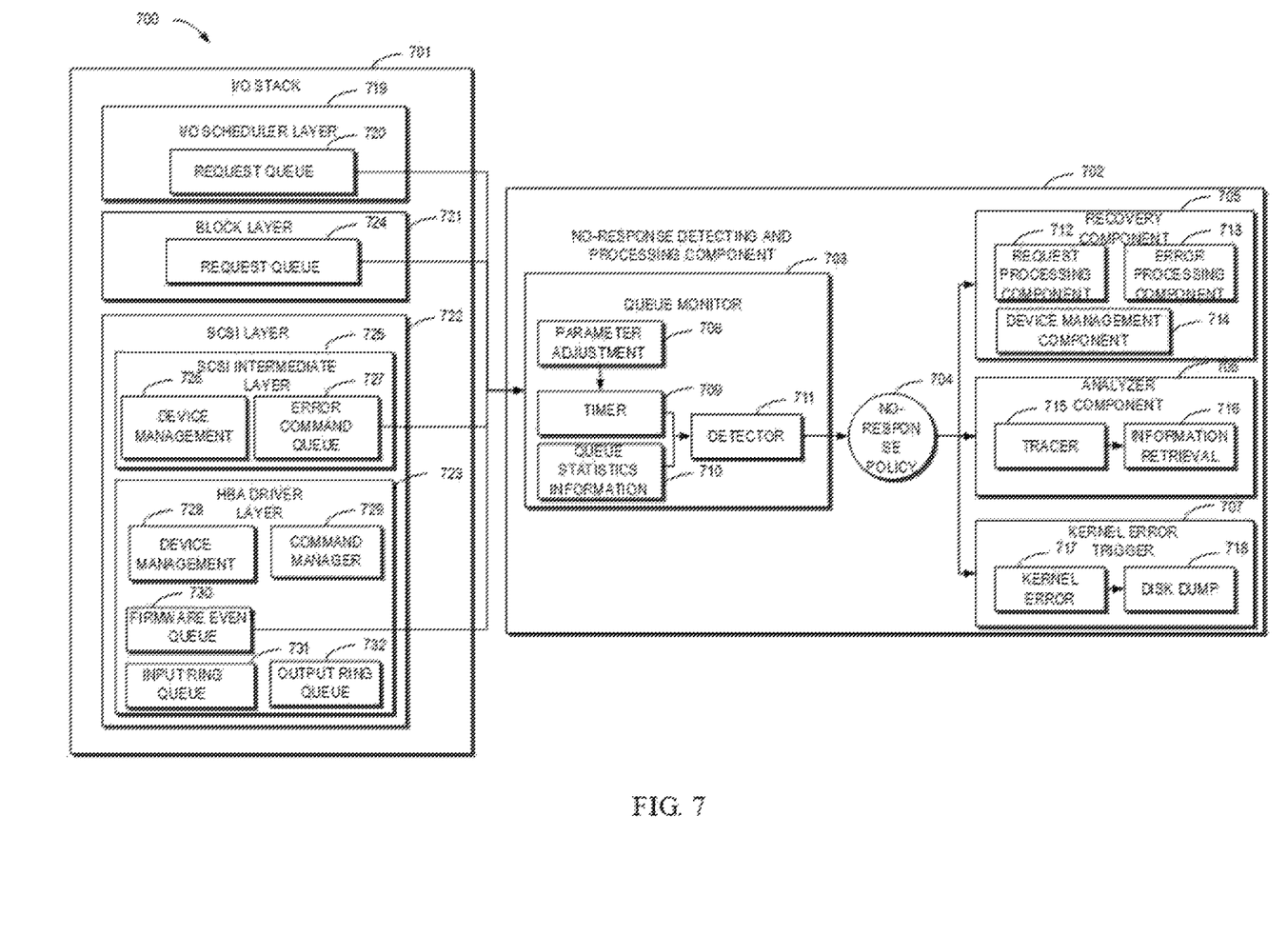
FIG. 7 is an architecture diagram illustrating a system 700 for managing an I/O stack in accordance with embodiments of the present disclosure.

FIG. 1 above depicts an overview of the storage system 100. Reference will be made to FIG. 7 below to illustrate a schematic diagram of a storage system 700 as another example.

The management system 700 includes an I/O stack 701 and a no-response detecting and processing component 702.

The I/O stack 701 is used to transmit input/output request between the processor and the external storage device. The I/O stack 701 includes an I/O scheduler layer 719, a block layer 721 and a small computer system interface (SCSI) 722 layer and so on. These layers inside the I/O stack 701 transmit I/O operations with each other through a proper configuration.

The I/O scheduler layer 719 receives I/O request from the processor and places the I/O request into a request queue 720 through a scheduling algorithm operating therein. For example, during scheduling, the important request is placed in the head of the queue based on the basis of the quality of service (QOS) so that the I/O request can be processed in advance to improve the I/O processing efficiency.

The block layer 721 is used to place the request received from the I/O scheduler layer 719 into the request queue 724. At this layer, the I/O request will be merged and sent down to the next layer for further processing.

SCSI layer 722 includes an SCSI intermediate layer 725 and a host bus adapter (HBA) layer 723. The same as the above two layers, the SCSI intermediate layer 725 and the host bus adapter (HBA) layer 723 each have an error command queue 727 and a firmware (FM) event queue 730 which are used to process error commands during the process of processing I/O request and storing firmware event information for founding the device, respectively.

The request queue 720 at the scheduler layer 719, the request queue 724 at the block layer 721, the error command queue 727 at the SCSI intermediate layer 725 and the firmware (FW) event queue 730 at the host bus adapter (HBA) layer 723 store requests, commands or events sequentially. If a first request, command or event in the queues has no response, there will be a queue congestion causing the whole system to fail to operate normally.

In an embodiment, when the requests, commands or events are placed in the queues at each corresponding layer inside the I/O stack, a timestamp is provided for each of the requests, commands or event information. Since the queues are sequential, the request with the longest waiting time in the queue can be known by the timestamp of a first element in each queue.

In some embodiments of the present disclosure, there is further configured a no-response detecting and processing component 702 which includes a queue monitor 703, a no-response policy module 704, a recovery module 705, an analyzer module 706 and a kernel error trigger 707.

The queue monitor 703 is used to monitor queues in each layer of the I/O stack to determine which queue is not responded to for a long time so as to determine if there is a problem in the queue. In some embodiments, the queue monitor 703 is configured with a parameter adjustment module 708, a timer 709, a queue statistics information module 710 and a detector 711.

The parameter adjustment module 708 is used to adjust the time domain value inside the timer 709 which stores a threshold time length. With the threshold time length, it can be determined whether the queue is not responded to for a long time. If yes, it shows that the queue is problematic. In an embodiment, the time domain value may be adjusted by the user, for instance, through a parameter adjusting module. In another embodiment, the time domain value may be configured in any manner based on user's needs. In an embodiment, a time threshold for all the queues is stored in the timer 709. In another embodiment, different time thresholds for different queues may be stored in the timer 709.

The queue statistics information module 710 is used to store information about the queues obtained from I/O stack 701. In an embodiment, the information includes length of the queue, timestamp, queue identifier number and so on. Additionally or alternatively, the information may further include any information about queues in the I/O stack that the user wants to obtain.

The detector 711 is used to determine whether the length of time of the request in the queue exceeds a threshold time length. In an embodiment, the detector 711 obtains timestamp information of the stored queues from the queue statistics information module 710 and determines the length of time that the first request in the queue waits for. If this length of time exceeds the threshold time length, the detector 711 will generate a warning message to invoke a solution for solving the problem that the queue is not responded to for a long time. In an embodiment, respective solution may be initiated directly through the warning message. In another alternative embodiment, the warning message may be stored in the device and read by another module to achieve the invoking for the solution.

The no-response policy module 704 is used to receive an instruction from the user about how to configure solutions. As users of the computing device have different requirements about how to process problems in I/O stack, a configuration interface is provided for different users through the no-response policy module 704 so that the users can select different processing patterns based on their own demands. In an embodiment of the present disclosure, the processing pattern is predetermined. Additionally or alternatively, different processing patterns may be added based on user's requirements.

The recovery module 705 is a component used to process requests, commands or events that are not responded to for a long time. In the recovery module 705, the spare path for a request queue is selected or the operation of terminating device discovery is performed for commands during the period of hardware discovery so as to solve the problem that the queue is not responded to for a long time. The recovery module 705 is configured to at least include a request processing component 712, an error processing component 713 and a device management component 714. The above different components are used to process congestion of different queues, respectively.

The analyzer component 706 is another component used to process requests, commands or events that are not responded to for a long time in the queue. In the analyzer module 706, the lookup analysis is executed to determine reasons that the queues are not responded to for a long time.

The analyzer component 706 includes a tracer 715 and an information retrieval component 716. The tracer 715 is used to collect all the information from the I/O stack 101 and then filter information irrelevant to requests in the congested I/O queues through a filtering component inside the analyzer component and retain information associated with the congested requests. The information related to the congested requests is obtained through the tracer and will be provided to the information retrieval component 716 which determines from at least one operation the operation that causes the I/O request to wait for processing.

A kernel error trigger 707 is still another component to process requests, commands or events that are not responded to for a long time in the queue. In response to the waiting time length for the queue being larger than the threshold time length, the kernel error trigger 707 performs kernel error act processing directly and stores all the data in the operation of the computing device to an external storage device, for instance, dump all the data in the I/O stack into an external storage device.

The kernel error trigger component 707 includes a kernel error component 717 used to accomplish acts related to kernel error, and a disk dump component 718 for duplicating all data stored in a processor or memory into an external storage device to realize data dump.

The kernel error trigger 707 is used to perform the method shown in the above FIG. 3, the analyzer module 706 is used to perform the method in the above FIG. 4 and the recovery module 705 is used to perform the method shown in FIG. 5 or FIG. 6.

Figure 8:
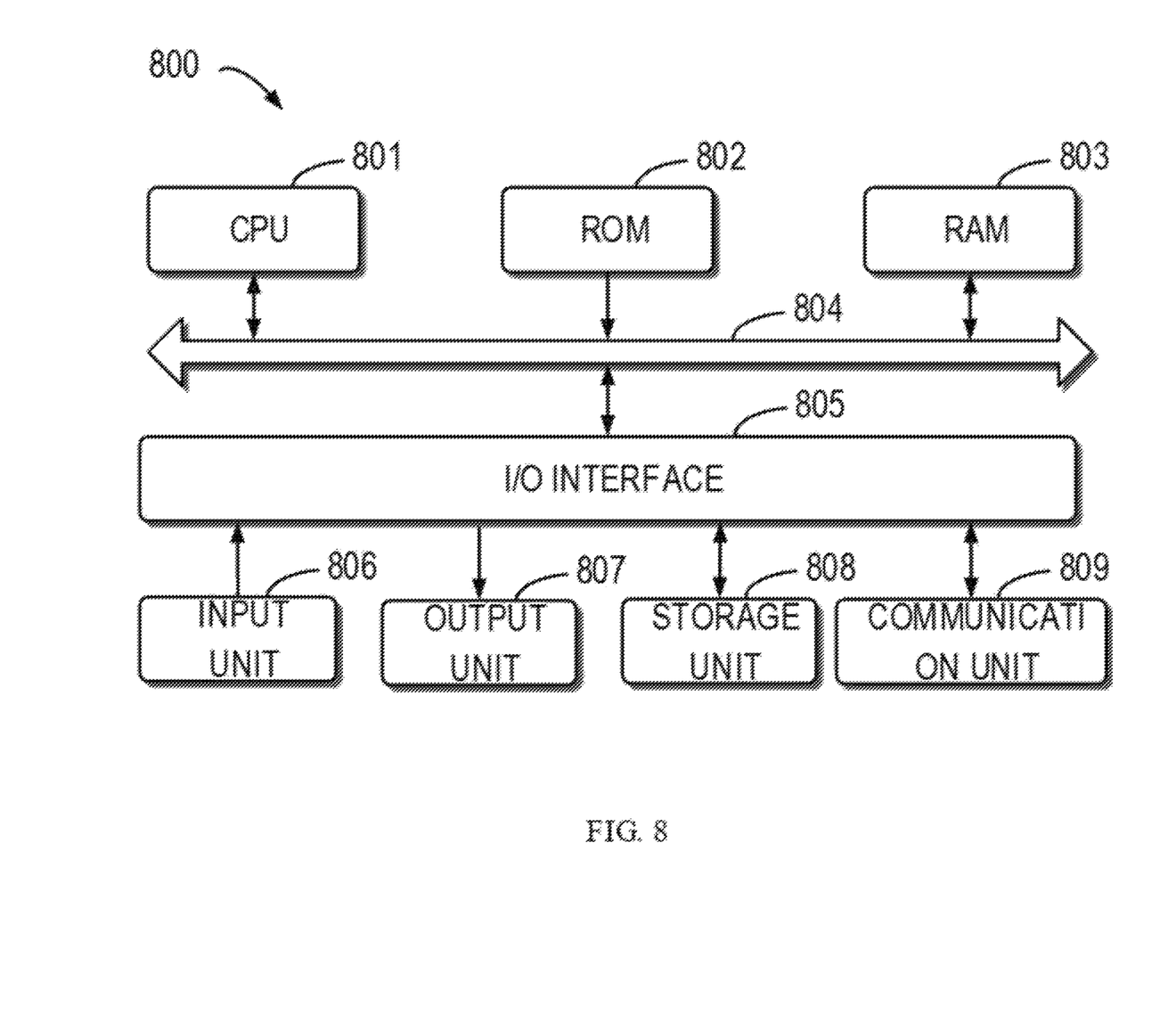
FIG. 8 is a schematic block diagram illustrating an example device 800 suitable to implement embodiments of the present disclosure.

FIG. 8 is a schematic block diagram illustrating an example device 800 that can be used to implement embodiments of the present disclosure. For example, any of 101, 102, 103 and 104 shown in FIGS. 1 and 701, 702, 703, 705, 706 and 707 in FIG. 7 may be implemented by the device 800. As illustrated, the device 800 includes a central processing unit (CPU) 801, which can execute various appropriate actions and processing based on the computer program instructions stored in a read-only memory (ROM) 802 or the computer program instructions loaded into a random access memory (RAM) 803 from a storage unit 808. The RAM 803 also stores all kinds of programs and data required by operating the storage apparatus 800. CPU 801, ROM 802 and RAM 803 are connected to each other via a bus 804, to which an input/output (I/O) interface 805 is also connected.

A plurality of components in the device 800 are connected to the I/O interface 805, comprising: an input unit 806, such as keyboard, mouse and the like; an output unit 807, such as various types of displays, loudspeakers and the like; a storage unit 808, such as the storage disk, optical disk and the like; and a communication unit 809, such as network card, modem, wireless communication transceiver and the like. The communication unit 809 allows the device 800 to exchange information/data with other devices through computer networks such as Internet and/or various telecommunication networks.

Each procedure and processing described above, such as method 200, 300, 400, 500 and 600, can be performed by a processing unit 801. For example, in some embodiments, method 200, 300, 400, 500 and 600 can be implemented as computer software programs, which are tangibly included in a machine-readable medium, such as storage unit 808. In some embodiments, the computer program can be partially or completely loaded and/or installed to the device 800 via ROM 802 and/or the communication unit 809. When the computer program is loaded to RAM 803 and executed by CPU 801, one or more steps of the above described method 200, 300, 400, 500 and 600 are performed.

The present disclosure may be a method, an apparatus, a system and/or a computer program product. The computer program product can include a computer-readable storage medium having computer-readable program instructions stored thereon for executing various aspects of the present disclosure.

The computer-readable storage medium can be a tangible device capable of holding and storing instructions used by the instruction-executing device. The computer-readable storage medium can be, but not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here can be downloaded from the computer-readable storage medium to various computing/processing devices, or to external computers or external storage devices via network, such as Internet, local area network, wide area network and/or wireless network. The network can comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storing into the computer-readable storage medium of each computing/processing device.

The computer program instructions for executing the operations of the present disclosure can be assembly instructions, instructions of instruction set architecture (ISA), machine instructions, machine-related instructions, microcodes, firmware instructions, state setting data, or a source code or target code written by any combinations of one or more programming languages including object-oriented programming languages, such as Smalltalk, C++ and so on, and conventional procedural programming languages, such as "C" language or similar programming languages. The computer-readable program instructions can be completely or partially executed on the user computer, or executed as an independent software package, or executed partially on the user computer and partially on the remote computer, or completely executed on the remote computer or the server. In the case where a remote computer is involved, the remote computer can be connected to the user computer by any type of networks, including local area network (LAN) or wide area network (WAN), or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit can execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof can be implemented by the computer-readable program instructions.

The computer-readable program instructions can be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions can also be stored in the computer-readable storage medium. These instructions enable the computer, the programmable data processing device and/or other devices to operate in a particular way, such that the computer-readable medium storing instructions can comprise a manufactured article that includes instructions for implementing various aspects of the functions/actions specified in one or more blocks of the flow chart and/or block diagram.

The computer-readable program instructions can also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow chart and block diagram present possible architecture, functions and operations realized by the system, method and computer program product according to a plurality of embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those ordinary skilled in the art.

We claim:

1. A method of managing an input/output (I/O) stack, comprising:
   obtaining metadata related to an I/O request stored in the I/O stack, the metadata at least comprising a timestamp when the I/O request is placed in the I/O stack;
   determining, based on the timestamp, a length of time during which the I/O request waits for processing;
   determining a number of I/O requests currently queuing at a layer where the I/O request in an I/O queue is located;
   adjusting a threshold time length based on the number; and
   in response to the length of time exceeding the threshold time length, performing a predetermined operation on the I/O request to prevent the I/O stack from being congested.

2. The method according to claim 1, wherein performing a predetermined operation on the I/O request comprises:
   ceasing all I/O requests in the I/O stack; and
   storing all data in the I/O stack into an external storage device.

3. The method according to claim 1, wherein performing a predetermined operation on the I/O request comprises:
   obtaining from the I/O stack, information on at least one operation for processing the I/O request; and
   determining, based on the information, an operation from the at least one operation that causes the I/O request to wait for processing in order to process.

4. The method according to claim 1, wherein performing a predetermined operation on the I/O request comprises:
   determining whether a fault is present in one or more devices involved in the I/O request;
   in response to determining that a fault is present in at least one of the one or more devices, determining whether there is an alternative device that can replace the at least one device to enable the I/O request to be performed; and
   in response to finding the alternative device, performing the I/O request at least in part based on the alternative device.

5. The method according to claim 1, wherein performing a predetermined operation on the I/O request comprises:
   in response to the I/O request involving a discovery process for an external device, terminating the discovery process.

6. A manager for an input/output (I/O) stack, comprising:
   a processor; and
   a memory having computer program instructions stored thereon, the processor executing the computer program instructions in the memory to control the manager to perform acts comprising:
   obtaining metadata related to an I/O request stored in the I/O stack, the metadata at least comprising a timestamp when the I/O request is placed in the I/O stack; determining, based on the timestamp, a length of time during which the I/O request waits for processing;
   determining a number of I/O requests currently queuing at a layer where the I/O request in an I/O queue is located;
   adjusting a threshold time length based on the number; and
   in response to the length of time exceeding the threshold time length, performing a predetermined operation on the I/O request to prevent the I/O stack from being congested.

7. The manager according to claim 6, wherein performing a predetermined operation on the I/O request comprises:
   ceasing all I/O requests in the I/O stack; and
   storing all data in the I/O stack into an external storage device.

8. The manager according to claim 6, wherein performing a predetermined operation on the I/O request comprises:
   obtaining from the I/O stack, information on at least one operation for processing the I/O request; and
   determining, based on the information, an operation from the at least one operation that causes the I/O request to wait for processing in order to process.

9. The manager according to claim 6, wherein performing a predetermined operation on the I/O request comprises:
   determining whether a fault is present in one or more devices involved in the I/O request;
   in response to determining that a fault is present in at least one of the one or more devices, determining whether there is an alternative device that can replace the at least one device to enable the I/O request to be performed; and
   in response to finding the alternative device, performing the I/O request at least in part based on the alternative device.

10. The manager according to claim 6, wherein performing a predetermined operation on the I/O request comprises:
    in response to the I/O request involving a discovery process for an external device, terminating the discovery process.

11. A computer program product being tangibly stored on a non-volatile computer readable medium and comprising computer executable instructions which, when executed, cause a machine to perform acts comprising:

obtaining metadata related to an I/O request stored in the I/O stack, the metadata at least comprising a timestamp when the I/O request is placed in the I/O stack;

determining, based on the timestamp, a length of time during which the I/O request waits for processing;

determining a number of I/O requests currently queuing at a layer where the I/O request in an I/O queue is located;

adjusting a threshold time length based on the number; and in response to the length of time exceeding the threshold time length, performing a predetermined operation on the I/O request to prevent the I/O stack from being congested.

12. The computer program product according to claim 11, wherein performing a predetermined operation on the I/O request comprises:

ceasing all I/O requests in the I/O stack; and storing all data in the I/O stack into an external storage device.

13. The computer program product according to claim 11, wherein performing a predetermined operation on the I/O request comprises:

obtaining from the I/O stack, information on at least one operation for processing the I/O request; and determining, based on the information, an operation from the at least one operation that causes the I/O request to wait for processing in order to process.

14. The computer program product according to claim 11, wherein performing a predetermined operation on the I/O request comprises:

determining whether a fault is present in one or more devices involved in the I/O request;

in response to determining that a fault is present in at least one of the one or more devices, determining whether there is an alternative device that can replace the at least one device to enable the I/O request to be performed; and in response to finding the alternative device, performing the I/O request at least in part based on the alternative device.

15. The computer program product according to claim 11, wherein performing a predetermined operation on the I/O request comprises:

in response to the I/O request involving a discovery process for an external device, terminating the discovery process.

* * * * *